(12) United States Patent
Ota et al.

(10) Patent No.: US 8,996,577 B2
(45) Date of Patent: Mar. 31, 2015

(54) OBJECT INFORMATION PROVISION DEVICE, OBJECT INFORMATION PROVISION SYSTEM, TERMINAL, AND OBJECT INFORMATION PROVISION METHOD

(75) Inventors: Manabu Ota, Chiyoda-ku (JP); Yasuo Morinaga, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 180 days.

(21) Appl. No.: 13/878,868

(22) PCT Filed: Jun. 15, 2012

(86) PCT No.: PCT/JP2012/065385
§ 371 (c)(1),
(2), (4) Date: Apr. 11, 2013

(87) PCT Pub. No.: WO2013/008583
PCT Pub. Date: Jan. 17, 2013

(65) Prior Publication Data
US 2013/0198216 A1    Aug. 1, 2013

(30) Foreign Application Priority Data

Jul. 14, 2011 (JP) ................................. 2011-156027

(51) Int. Cl.
*G06F 17/30* (2006.01)
*G06T 11/00* (2006.01)
*G06K 9/68* (2006.01)

(52) U.S. Cl.
CPC .......... *G06F 17/30386* (2013.01); *G06T 11/00* (2013.01); *G06K 9/6857* (2013.01)

USPC ............ 707/791; 707/802; 707/822; 707/828

(58) Field of Classification Search
CPC ....................................................... G06F 17/30
USPC .................................................. 707/600–899
See application file for complete search history.

(56) References Cited

U.S. PATENT DOCUMENTS

| | | | | |
|---|---|---|---|---|
| 3,031,573 A | * | 4/1962 | Harlen et al. | ............. 250/361 R |
| 2010/0225747 A1 | * | 9/2010 | Chen et al. | ....................... 348/51 |

FOREIGN PATENT DOCUMENTS

JP    2007 304733    11/2007

OTHER PUBLICATIONS

International Preliminary Report on Patentability and Written Opinion issued Jan. 23, 2014 in PCT/JP2012/065385 filed Jun. 15, 2012.
International Search Report Issued Jul. 24, 2012 in PCT/JP12/65385 Filed Jun. 15, 2012.

* cited by examiner

*Primary Examiner* — Isaac M Woo
(74) *Attorney, Agent, or Firm* — Oblon, McClelland, Maier & Neustadt, L.L.P.

(57) ABSTRACT

In an object information provision system, at least one matching data is transmitted from an object information provision device to a terminal, and a result of image analysis based on the matching data is transmitted from the terminal to the object information provision device, and the amount of information of matching data is adjusted based on the image processing result. The success or failure of extraction of a valid physical object represented by the matching data in the terminal is thereby reflected on the amount of information of matching data.

12 Claims, 9 Drawing Sheets

| ID | PERFECT MATCHING DATA | POSITION AND DIRECTION | LEARNED FLAG | SIMPLIFICATION LEVEL AND IMAGE ANALYSIS RESULT | SIMPLIFIED MATCHING DATA | VIRTUAL OBJECT INFORMATION |
|---|---|---|---|---|---|---|
| 1 |  | EAST LONGITUDE aaa.aa LATITUDE bb.bb NE:xxDEGREES | 1 | 1:O.K 2:O.K 3:O.K. 4:NG |  |  |
| 2 |  | EAST LONGITUDE ccc.cc LATITUDE dd.dd SE:yyDEGREES | — | — |  |  |
| 3 |  | EAST LONGITUDE eee.ee LATITUDE ff.ff SW:zzDEGREES | 0 | 1:O.K 2:O.K 3:O.K. |  |  |

*Fig.7*

| ID | PERFECT MATCHING DATA | SIMPLIFIED MATCHING DATA | VIRTUAL OBJECT INFORMATION |
|----|----|----|----|
| 1 | | | |
| 3 | | | |

OBJECT INFORMATION PROVISION DEVICE, OBJECT INFORMATION PROVISION SYSTEM, TERMINAL, AND OBJECT INFORMATION PROVISION METHOD

TECHNICAL FIELD

The present invention relates to an object information provision device, an object information provision system, a terminal, and an object information provision method.

BACKGROUND ART

In recent years, a service using AR (Augmented Reality) technology has been developed and provided. For example, a technique that acquires a virtual object placed in the vicinity of the located position of a mobile terminal and displays a virtual object including various information and images superimposed on a real-space image acquired by a camera mounted on the mobile terminal is known. Further, a technique that detects a specified marker from a real-space image acquired by a camera of a mobile terminal and displays a virtual object associated with the marker superimposed on the real-space image on a display is known. Furthermore, a technique that acquires three-dimensional map information including information about the shape or the like of a structure in the real space through communication, performs image analysis to obtain matching between the acquired map information and a real-space image acquired by a camera, and, when they match, displays a virtual object superimposed on the real-space image in association with a specified physical object existing in the real space is known. On the other hand, in order to suitably detect a marker from images taken under various conditions, a device that generates images of the marker with various colors, luminance, contrast, resolution and focus from a registered image of the marker and detects the marker based on the generated images is known (for example, see Patent Literature 1).

CITATION LIST

Patent Literature

PTL 1: Japanese Unexamined Patent Application Publication No. 2007-304733

SUMMARY OF INVENTION

Technical Problem

In the above-described technique that displays a virtual object based on matching between three-dimensional map information and a real-space image, the three-dimensional map information serving as matching data used for the matching has a vast amount of information. Therefore, problems such as long communication time for acquiring matching data, heavy traffic on communication line, expensive communication charge and long matching processing time occur due to the vast amount of information of matching data. Because the technique disclosed in Patent Literature 1 generates varieties of the prestored image of a marker for the purpose of improving detection accuracy, the above-described problems due to the vast amount of information of matching data cannot be solved.

The present invention has been accomplished to solve the above problems and an object of the present invention is thus to provide an object information provision device, an object information provision system, a terminal, and an object information provision method that, in AR technology that extracts a specified physical object on a real-space image and displays a virtual object in association with the physical object, can provide matching data having an appropriate amount of information without degrading the accuracy of matching with a physical object on a real-space image.

Solution to Problem

To solve the above problem, an object information provision device according to one embodiment of the present invention is an object information provision device that provides virtual object information associated with matching data to a terminal that extracts a physical object matched to matching data for extracting a specified physical object from a real-space image by a certain percentage or more from a real-space image and displays a virtual object associated with the matching data superimposed on the real-space image in association with the physical object, including a transmitting means for transmitting at least one matching data among a plurality of matching data containing different levels of amount of information together with virtual object information associated with the matching data to the terminal, a receiving means for receiving a processing result indicating success or failure of extraction of a valid physical object represented by the matching data in image analysis that extracts a physical object from a real-space image in the terminal based on the matching data transmitted by the transmitting means from the terminal, and an adjustment means for adjusting the amount of information of matching data to be provided in association with the virtual object information to the terminal based on the processing result received by the receiving means.

To solve the above problem, an object information provision system according to one embodiment of the present invention is an object information provision system including a terminal that extracts a physical object matched to matching data for extracting a specified physical object from a real-space image by a certain percentage or more from a real-space image and displays a virtual object associated with the matching data superimposed on the real-space image in association with the physical object, and an object information provision device that provides virtual object information associated with matching data to the terminal, the object information provision device including a transmitting means for transmitting at least one matching data among a plurality of matching data containing different levels of amount of information together with virtual object information associated with the matching data to the terminal, a receiving means for receiving a processing result indicating success or failure of extraction of a valid physical object represented by the matching data in image analysis that extracts a physical object from a real-space image in the terminal based on the matching data transmitted by the transmitting means from the terminal, and an adjustment means for adjusting the amount of information of matching data to be provided in association with the virtual object information to the terminal based on the processing result received by the receiving means, and the terminal including an object information receiving means for receiving the matching data and the virtual object information transmitted from the transmitting means, an image analysis means for performing the image analysis based on the matching data received by the object information receiving means, and an image analysis result transmitting means for transmitting the processing result in the image analysis performed by the image analysis means to the object information provision device.

To solve the above problem, a terminal according to one embodiment of the present invention is a terminal in an object information provision system including the terminal that extracts a physical object matched to matching data for extracting a specified physical object from a real-space image by a certain percentage or more from a real-space image and displays a virtual object associated with the matching data superimposed on the real-space image in association with the physical object, and an object information provision device that provides virtual object information associated with matching data to the terminal, including an object information receiving means for receiving at least one matching data among a plurality of matching data containing different levels of amount of information together with virtual object information associated with the matching data from the object information provision device, an image analysis means for performing image analysis that extracts a physical object from a real-space image based on the matching data received by the object information receiving means, and an image analysis result transmitting means for transmitting a processing result indicating success or failure of extraction of a valid physical object represented by the matching data in image analysis performed by the image analysis means to the object information provision device.

Further, to solve the above problem, an object information provision method according to one embodiment of the present invention is an object information provision method in an object information provision device that provides virtual object information associated with matching data to a terminal that extracts a physical object matched to matching data for extracting a specified physical object from a real-space image by a certain percentage or more from a real-space image and displays a virtual object associated with the matching data superimposed on the real-space image in association with the physical object, including a transmitting step of transmitting at least one matching data among a plurality of matching data containing different levels of amount of information together with virtual object information associated with the matching data to the terminal, a receiving step of receiving a processing result indicating success or failure of extraction of a valid physical object represented by the matching data in image analysis that extracts a physical object from a real-space image in the terminal based on the matching data transmitted in the transmitting step from the terminal, and an adjustment step of adjusting the amount of information of matching data to be provided in association with the virtual object information to the terminal based on the processing result received in the receiving step.

Further, to solve the above problem, an object information provision method an object information provision method is an object information provision method in a system including a terminal that extracts a physical object matched to matching data for extracting a specified physical object from a real-space image by a certain percentage or more from a real-space image and displays a virtual object associated with the matching data superimposed on the real-space image in association with the physical object, and an object information provision device that provides virtual object information associated with matching data to the terminal, including a transmitting step of transmitting at least one matching data among a plurality of matching data containing different levels of amount of information together with virtual object information associated with the matching data from the object information provision device to the terminal, an object information receiving step of receiving the one matching data and the virtual object information transmitted in the transmitting step by the terminal, an image analysis step of performing image analysis that extracts a physical object from a real-space image in the terminal based on the matching data received in the object information receiving step, an image analysis result transmitting step of transmitting a processing result indicating success or failure of extraction of a valid physical object represented by the matching data in the image analysis performed in the image analysis step from the terminal to the object information provision device, a receiving step of receiving the processing result transmitted in the image analysis result transmitting step by the object information provision device, and an adjustment step of adjusting the amount of information of matching data to be provided in association with the virtual object information to the terminal in the object information provision device based on the processing result received in the receiving step.

According to the above embodiments, at least one matching data is transmitted from the object information provision device to the terminal, a result of image analysis based on the matching data is transmitted from the terminal to the object information provision device, and the amount of information of matching data is adjusted based on the image processing result. The success or failure of extraction of a valid physical object represented by the matching data in the terminal is thereby reflected on the amount of information of matching data. It is thereby possible to provide matching data having an appropriate amount of information without degrading the accuracy of matching between matching data and a physical object in a real-space image.

Further, in the object information provision device according to another embodiment, the plurality of matching data include one perfect matching data with the largest amount of information among the plurality of matching data and a plurality of simplified matching data containing different levels of amount of information, the transmitting means transmits the perfect matching data and simplified matching data containing one level of amount of information among a plurality of levels of amount of information together with the virtual object information, and the adjustment means associates simplified matching data having a smaller amount of information than the one level of amount of information with the virtual object information when the valid physical object is extracted in the image analysis based on the simplified matching data, and associates simplified matching data having a larger amount of information than the one level of amount of information with the virtual object information when the valid physical object is not extracted.

Further, in the object information provision system according to another embodiment, the plurality of matching data include one perfect matching data with the largest amount of information among the plurality of matching data and a plurality of simplified matching data containing different levels of amount of information, the transmitting means transmits the perfect matching data and simplified matching data containing one level of amount of information among a plurality of levels of amount of information together with the virtual object information, the adjustment means associates simplified matching data having a smaller amount of information than the one level of amount of information with the virtual object information when the valid physical object is extracted in the image analysis, and associates simplified matching data having a larger amount of information than the one level of amount of information with the virtual object information when the valid physical object is not extracted in the image analysis, the object information receiving means receives the perfect matching data and the simplified matching data transmitted from the transmitting means, the image analysis means performs the image analysis based on each of the perfect matching data and the simplified matching data received by the object information receiving means, and the image analysis result transmitting means transmits a processing result indicating that a valid physical object is extracted to the object information provision device when a physical object extracted based on the perfect matching data and a physical object extracted based on the simplified matching data match, and transmits a processing result indicating that a valid physical object is not extracted to the object information provision device when a physical object extracted based on the perfect matching data and a physical object extracted based on the simplified matching data do not match.

Further, in the terminal according to another embodiment, the plurality of matching data include one perfect matching data with the largest amount of information among the plurality of matching data and a plurality of simplified matching data containing different levels of amount of information, the object information receiving means receives the perfect matching data and simplified matching data containing one level of amount of information among a plurality of levels of amount of information transmitted from the transmitting means, the image analysis means performs the image analysis based on each of the perfect matching data and the simplified matching data received by the object information receiving means, and the image analysis result transmitting means transmits a processing result indicating that a valid physical object is extracted to the object information provision device when a physical object extracted based on the perfect matching data and a physical object extracted based on the simplified matching data match, and transmits a processing result indicating that a valid physical object is not extracted to the object information provision device when a physical object extracted based on the perfect matching data and a physical object extracted based on the simplified matching data do not match According to the above embodiments, the perfect matching data and the simplified matching data are transmitted from the object information provision device to the terminal, and image analysis based on each of the matching data is performed, and when physical objects extracted in the respective image analysis match, the amount of information of simplified matching data is adjusted to be one level lower, and, when they do not match, the amount of information of simplified matching data is adjusted to be one level higher. The amount of information of simplified matching data associated with the virtual object information is thereby set appropriately in accordance with the success or failure of extraction of a valid physical object.

Furthermore, in the object information provision device according to yet another embodiment, when the valid physical object is not extracted in the image analysis, the adjustment means may associate simplified matching data having a larger amount of information than the one level of amount of information with the virtual object information and set a learned flag indicating that simplified matching data suitable for extracting a valid physical object is associated with the virtual object information in association with the virtual object information.

Furthermore, in the object information provision system according to yet another embodiment, when the valid physical object is not extracted in the image analysis, the adjustment means may associate simplified matching data having a larger amount of information than the one level of amount of information with the virtual object information and set a learned flag indicating that simplified matching data suitable for extracting a valid physical object is associated with the virtual object information in association with the virtual object information.

According to the above embodiments, the image analysis using each of the perfect matching data and the simplified matching data is performed sequentially, and when a valid physical object is not extracted after the image analysis in which a valid physical object is extracted in the image analysis based on the simplified matching data, simplified matching data whose amount of information is one level higher than the simplified matching data is associated with the virtual object information, and therefore simplified matching data with the smallest amount of information among the simplified matching data for extracting a valid physical object is associated with the virtual object information. Thus, the simplified matching data of which the accuracy of matching with a physical object and the amount of information are optimized is associated with the virtual object information. Further, because the learned flag is set at this time, the system can recognize that the optimized simplified matching data is associated with the virtual object information.

Furthermore, in the object information provision device according to yet another embodiment, the transmitting means may transmit simplified matching data associated with the virtual object information together with the virtual object information when the learned flag is set in association with the virtual object information, and the adjustment means may unset the learned flag related to the virtual object information when an object different from a valid physical object is extracted in the image analysis based on the simplified matching data transmitted by the transmitting means.

Furthermore, in the object information provision system according to yet another embodiment, the transmitting means may transmit simplified matching data associated with the virtual object information together with the virtual object information when the learned flag is set in association with the virtual object information, the adjustment means may unset the learned flag related to the virtual object information when an object different from a valid physical object is extracted in the image analysis based on the simplified matching data transmitted by the transmitting means, the image analysis means may perform the image analysis based on the simplified matching data received by the object information receiving means, and the image analysis result transmitting means may transmit a processing result indicating that an object different from a valid physical object is extracted to the object information provision device when a plurality of physical objects are extracted based on the simplified matching data in the image analysis.

According to the above embodiments, the learned flag is unset when an object different from a valid physical object is extracted from a real-space image in the image analysis based on the simplified matching data that has been once optimized in terms of the amount of information, and therefore the process of optimizing the amount of simplified matching data is performed again. The degradation of accuracy of matching is thereby prevented.

Advantageous Effects of Invention

According to one aspect of the present invention, it is possible to provide matching data having an appropriate amount of information without degrading the accuracy of matching with a physical object on a real-space image in AR technology that extracts a specified physical object on a real-space image and displays a virtual object in association with the physical object.

BRIEF DESCRIPTION OF DRAWINGS

FIG. 7 is a diagram showing a structure of an object information storage unit and an example of data stored therein in the terminal.

DESCRIPTION OF EMBODIMENTS

Figure 1:
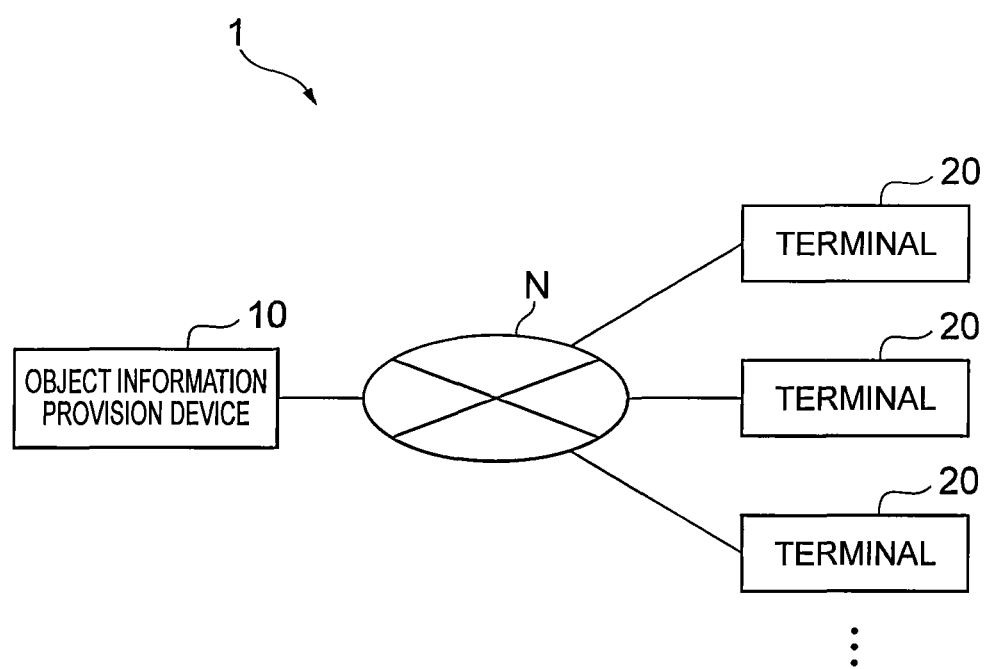
FIG. 1 is a block diagram showing a device configuration of an object information provision system.

Embodiments of an object information provision device, an object information provision system, a terminal, and an object information provision method according to the present invention are described hereinafter with reference to the drawings. Note that, where possible, the same elements are denoted by the same reference numerals and redundant description thereof is omitted.

FIG. 1 is a diagram showing a device configuration of an object information provision system 1. The object information provision system 1 includes an object information provision device 10 and a terminal 20. The object information provision device 10 and the terminal 20 can communicate with each other through a communication network N that is the Internet, a wireless LAN, a mobile communication network or the like. The terminal 20 is a mobile terminal, a personal computer or the like, for example. Although three terminals 20 are shown in FIG. 1, the number of terminals 20 in the object information provision system 1 is arbitrary.

The object information provision system 1 according to this embodiment assumes AR technology that provides three-dimensional map information containing information about the shape or the like of a structure in the real space from the object information provision device 10 to the terminal 20 through communication, performs image analysis to obtain matching between the map information and a real-space image acquired by a camera in the terminal 20, and, when they match, displays a virtual object superimposed on the real-space image in association with a specified physical object existing in the real space.

The object information provision device 10 is a device that provides virtual object information to a terminal and is configured as a computer such as a server, for example. The virtual object information contains image data of a virtual object to be displayed superimposed on a real-space image in the terminal 20. The virtual object information is associated with matching data for extracting a specified physical object from a real-space image.

The terminal 20 is a device that extracts a specified physical object from a real-space image based on matching data and displays a virtual object associated with the matching data so that it is superimposed on a real-space image in association with the physical object. The matching data is image data representing a specified physical object in the real space. The specified physical object may be any structure such as a building or a geographic feature existing in the real space, for example, that can be extracted from a real-space image by image analysis.

Figure 2:
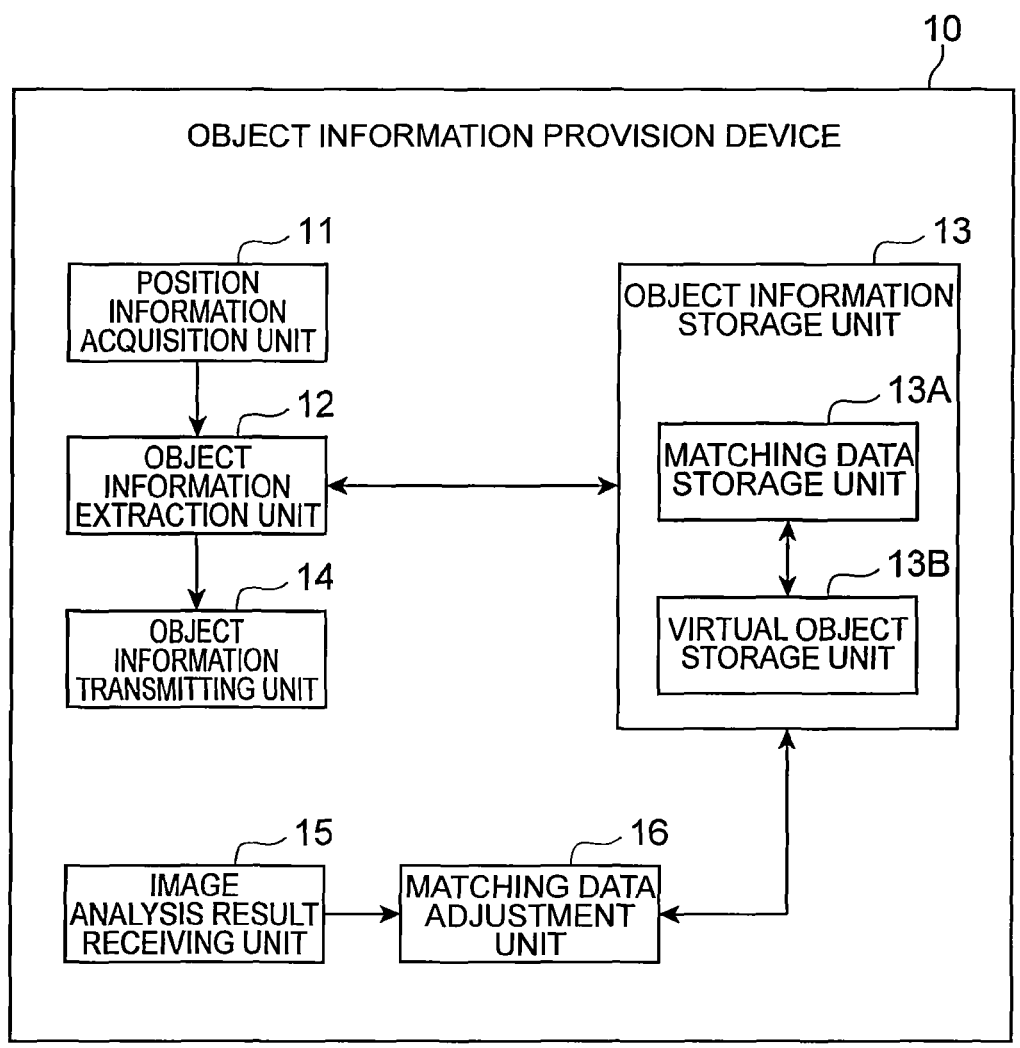
FIG. 2 is a block diagram showing a functional configuration of an object information provision device.

FIG. 2 is a block diagram showing a functional configuration of the object information provision device 10. As shown in FIG. 2, the object information provision device 10 includes, as functional components, a position information acquisition unit 11, an object information extraction unit 12, an object information storage unit 13, an object information transmitting unit 14 (transmitting means), an image analysis result receiving unit 15 (receiving means), and a matching data adjustment unit 16 (adjustment means).

Figure 3:
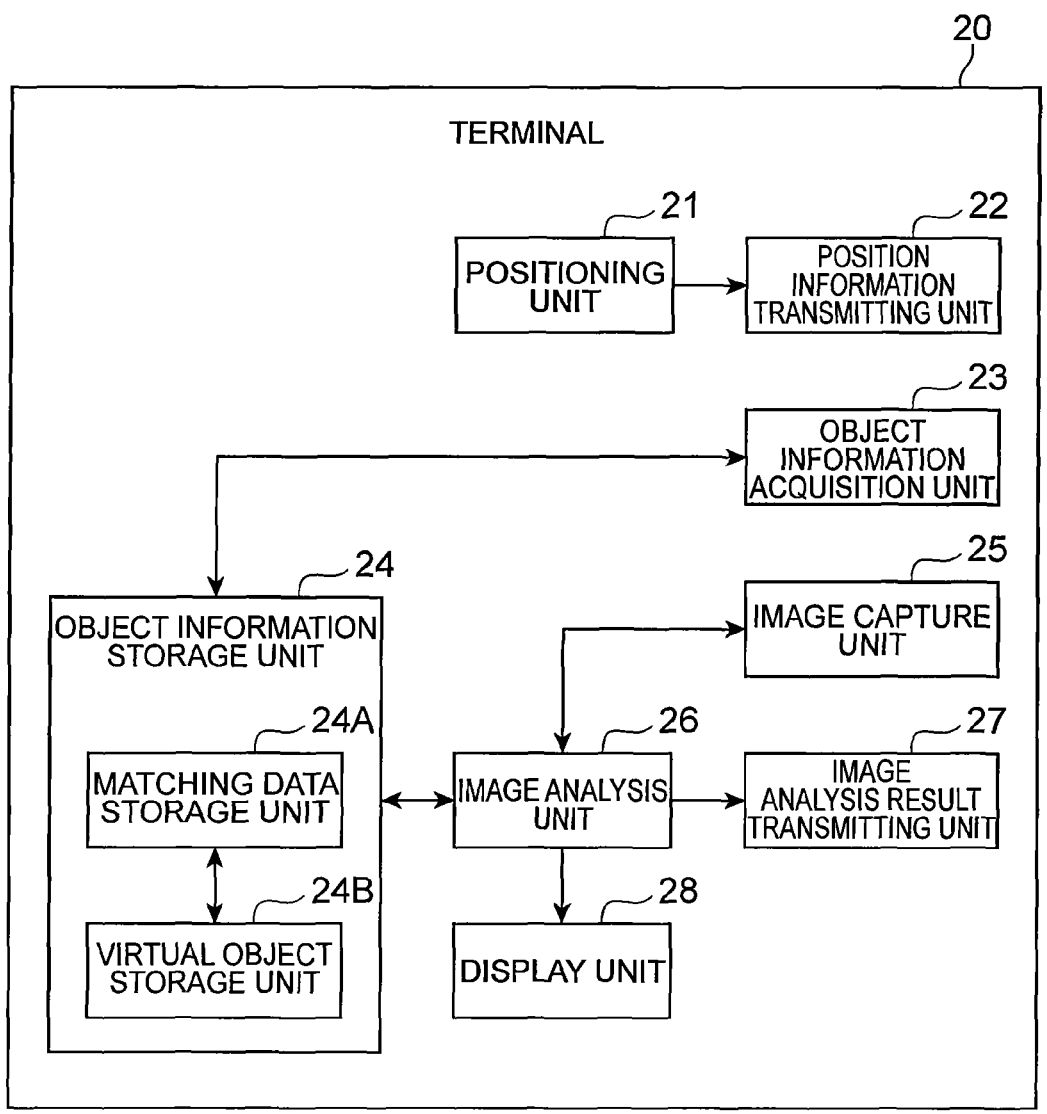
FIG. 3 is a block diagram showing a functional configuration of a terminal.

FIG. 3 is a block diagram showing a functional configuration of the terminal 20. As shown in FIG. 3, the terminal 20 includes, as functional components, a positioning unit 21, a position information transmitting unit 22, an object information acquisition unit 23 (object information receiving means), an object information storage unit 24, an image capture unit 25, an image analysis unit 26 (image analysis means), an image analysis result transmitting unit 27 (image analysis result transmitting means), and a display unit 28.

Figure 4:
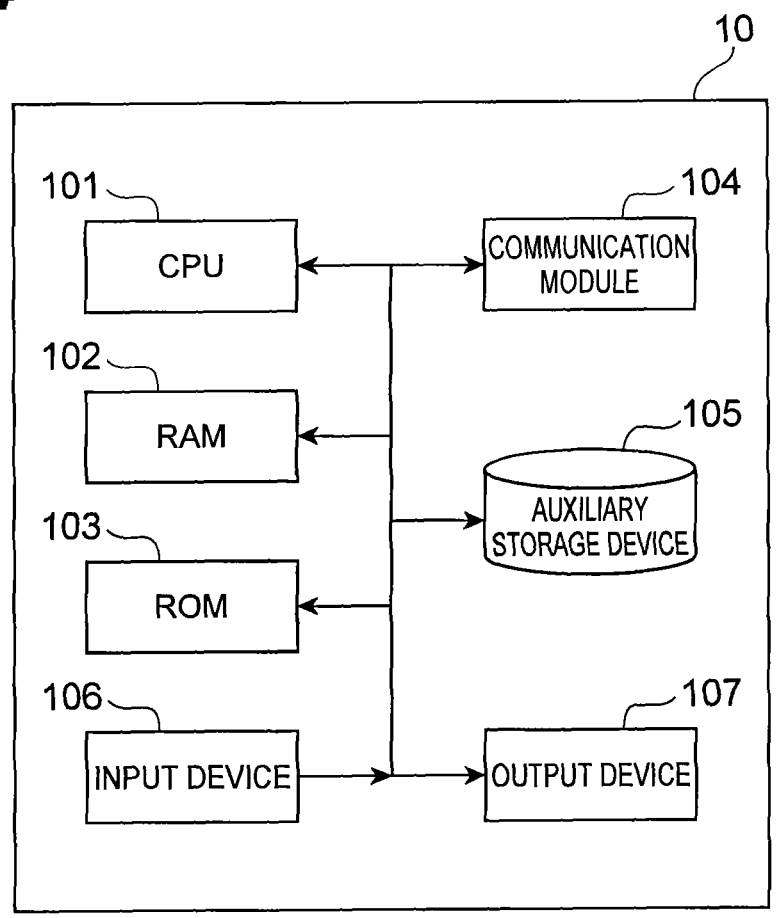
FIG. 4 is a hardware block diagram of the object information provision device.

FIG. 4 is a hardware block diagram of the object information provision device 10. As shown in FIG. 4, the object information provision device 10 is physically configured as a computer system that includes a CPU 101, a RAM 102 and a ROM 103 which are a main storage device, a communication module 104 which is a data transmitting and receiving device, an auxiliary storage device 105 such as a hard disk or flash memory, an input device 106 such as a keyboard, an output device 107 such as a display and the like. The functions shown in FIG. 2 are implemented by loading given computer software onto hardware such as the CPU 101 or the RAM 102 shown in FIG. 4, making the communication module 104, the input device 106 and the output device 107 operate under control of the CPU 101, and performing reading and writing of data in the RAM 102 or the auxiliary storage device 105. The terminal 20 shown in FIG. 3 also has the hardware configuration as shown in FIG. 4. The respective functional units of the object information provision device 10 are described hereinafter in detail with reference back to FIG. 2.

The position information acquisition unit 11 is a part that acquires position information indicating the located position of the terminal 20. The position information is transmitted from the position information transmitting unit 22 of the terminal 20. The position information acquisition unit 11 sends out the acquired position information to the object information extraction unit 12.

The object information extraction unit 12 is a part that extracts object information related to a virtual object placed in the vicinity of the position indicated by the position information acquired from the position information acquisition unit 11 from the object information storage unit 13 by reference to the object information storage unit 13. The object information extraction unit 12 sends out the extracted object information to the object information transmitting unit 14.

Figure 5:
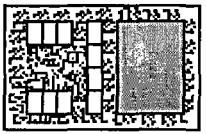
FIG. 5 is a diagram showing a structure of a virtual object storage unit and an example of data stored therein in the object information provision device.
Figure 5:
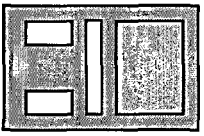
Figure 5:
Figure 5:
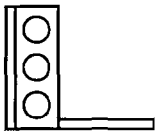
Figure 5:
Figure 5:
Figure 5:
Figure 5:
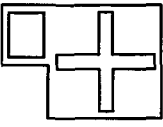
Figure 5:

The object information storage unit 13 is a part that stores object information, and it includes a matching data storage unit 13A and a virtual object storage unit 13B. FIG. 5 is a diagram showing a structure of the virtual object storage unit 13B and an example of data stored therein. As shown in FIG. 5, the virtual object storage unit 13B stores perfect matching data, position and direction, learned flag, simplification level and image analysis result, simplified matching data, and virtual object information for each ID that identifies object information.

The "perfect matching data" is matching data with the largest amount of information among a plurality of matching data representing one physical object. As described later, the object information storage unit 13 stores a plurality of matching data as matching data representing one physical object.

The "position and direction" is information indicating the position and direction of a physical object in the real space. The position is represented by the latitude and longitude, for example. The direction is represented by a rotation angle defined by a specified direction in the physical object with respect to a specified direction. The specified direction in the physical object is a normal direction where the physical object can be viewed just like an image indicated by matching data, for example. For example, "NE: xx degrees" represents the direction that rotates to the east (E) by xx degrees with respect to the north (N). Note that, in FIG. 5, "S" represents the south and "W" represents the west. Because a virtual object is displayed superimposed in association with a physical object in the real space, the information of "position" indicates the located position of a physical object and the located position of a virtual object at the same time.

The "learned flag" is a flag indicating that simplified matching data that is suitable for extracting a valid physical object is associated with the virtual object information. The learned flag "1" indicates the state where simplified matching data having the amount of information suitable for matching with a physical object in a real-space image has been selected from a plurality of simplified matching data and the adjustment of the amount of information of matching data by the matching data adjustment unit 16 has been completed. On the other hand, the learned flag "0" indicates the state where the adjustment of the amount of information of matching data by the matching data adjustment unit 16 has not yet been completed. The details of setting of the learned flag are described later.

The "image analysis result" is information indicating an image analysis result at each simplification level of simplified matching data, and it indicates the success or failure of extraction of a valid physical object using simplified matching data in the terminal 20. The details of an image analysis result are described later.

The "simplified matching data" is simplified matching data that is associated with the virtual object information at the current point of time. A plurality of matching data representing one physical object include perfect matching data and a plurality of simplified matching data containing different levels of amount of information. The "simplified matching data" in the virtual object storage unit 13B is simplified matching data having a certain level of amount of information among the plurality of simplified matching data.

The "virtual object information" is image data representing a virtual object that is displayed superimposed on a real-space image in the terminal 20.

Figure 6:
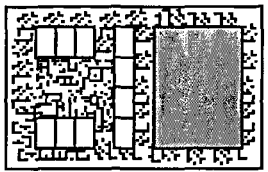
FIG. 6 is a diagram showing a structure of a matching data storage unit and an example of data stored therein in the object information provision device.

FIG. 6 is a diagram showing a structure of the matching data storage unit 13A and an example of data stored therein. As shown in FIG. 6, the matching data storage unit 13A stores a plurality of matching data representing a physical object for each physical object. The example of FIG. 6 shows a plurality of matching data associated with ID "1" in the virtual object storage unit 13B of FIG. 5. The matching data storage unit 13A shown in FIG. 6 stores one perfect matching data and simplified matching data with simplification levels 1 to 4.

Because matching data is image data, its amount of information differs largely depending on the way information is contained, such as the way of representing color tones and the resolution. The perfect matching data and the simplified matching data with simplification levels 1 to 4 are image data representing one physical object by different amounts of information. The perfect matching data is matching data containing the largest amount of information. The simplified matching data with the simplification level 1 is matching data obtained by performing noise reduction and monochromatization on the perfect matching data, for example. The simplified matching data with the simplification level 2 is matching data obtained by performing gray-scale processing on the simplified matching data with the simplification level 1, for example.

The simplified matching data with the simplification level 3 is matching data obtained by performing thinning on the simplified matching data with the simplification level 2, for example. The simplified matching data with the simplification level 4 is matching data obtained by performing white/black binarization on the simplified matching data with the simplification level 3, for example.

In the plurality of matching data obtained in this manner, the perfect matching data has the largest amount of information. The simplified matching data has a smaller amount of information as the simplification level is higher. Image analysis that extracts a physical object from a real-space image using matching data with a large amount of information is highly accurate but is subject to a high processing load. Further, communication of matching data with a large amount of information between devices takes a longer time than communication of matching data with a small amount of information. On the other hand, image analysis that extracts a physical object from a real-space image using matching data with a small amount of information is less accurate but is subject to a low processing load. Note that the above-described processing for obtaining each simplified matching data is just examples, and the processing is not limited thereto as long as matching data with different levels of amount of information are obtained.

The object information transmitting unit 14 is a part that transmits at least one matching data among a plurality of matching data containing different levels of amount of information together with virtual object information associated with the matching data to the terminal 20. The matching data and the virtual object information are included in object information that is sent out from the object information extraction unit 12.

Specifically, the object information transmitting unit 14 transmits matching data stored in the virtual object storage unit 13B (see FIG. 5) together with virtual object information extracted based on position information by the object information extraction unit 12 to the terminal 20.

More specifically, when the learned flag associated with the virtual object information is not set, the most suitable simplified matching data is not determined, and therefore the object information transmitting unit 14 transmits perfect matching data and simplified matching data to the terminal 20. The perfect matching data is used to determine whether a physical object that is extracted from a real-space image by image analysis using simplified matching data is valid or not. On the other hand, when the learned flag associated with the virtual object information is set, the most suitable simplified matching data is determined, and therefore the object information transmitting unit 14 transmits simplified matching data to the terminal 20.

The image analysis result receiving unit 15 is a part that receives, from the terminal 20, a notification of a processing result indicating the success or failure of extraction of a valid physical object represented by matching data in the image analysis to extract a physical object from a real-space image which has been performed in the terminal 20 based on the matching data transmitted from the object information transmitting unit 14 to the terminal 20.

The matching data adjustment unit 16 is a part that adjusts the amount of information of matching data to be provided to the terminal in association with virtual object information based on a processing result received by the image analysis result receiving unit 15. Specifically, when the image analysis result receiving unit 15 receives a notification indicating that a valid physical object has been extracted in the image analysis based on simplified matching data, the matching data adjustment unit 16 associates simplified matching data having a smaller amount of information than the above simplified matching data with the virtual object information. Thus, the matching data adjustment unit 16 changes the simplified matching data associated with the virtual object information in the virtual object storage unit 13B shown in FIG. 5 to simplified matching data with a simplification level that is one level higher and further sets "OK" to an image analysis result of the corresponding record as an image processing result by the simplified matching data that has been used.

On the other hand, when the image analysis result receiving unit 15 receives a notification indicating that a valid physical object has not been extracted in the image analysis based on simplified matching data, the matching data adjustment unit 16 associates simplified matching data having a larger amount of information than the above simplified matching data with the virtual object information and sets the learned flag in association with the virtual object information. Specifically, the matching data adjustment unit 16 changes the simplified matching data associated with the virtual object information in the virtual object storage unit 13B shown in FIG. 5 to simplified matching data with a simplification level that is one level lower and further sets "NG" to an image analysis result of the corresponding record as an image processing result by the simplified matching data that has been used. Then, the matching data adjustment unit 16 sets the learned flag in the record. Thus, at this point, simplified matching data with the smallest amount of information among the simplified matching data that can extract a valid physical object is associated with the virtual object information. The simplified matching data that is associated with the virtual object information is thereby optimized.

Further, in the case where the learned flag is set, when the image analysis result receiving unit 15 receives a notification indicating that an object different from a valid physical object has been extracted in the image analysis based on simplified matching data transmitted from the object information transmitting unit 14, the matching data adjustment unit 16 unsets the learned flag related to the virtual object information. The learned flag is thereby unset when an object different from a valid physical object is extracted from a real-space image in the image analysis based on the simplified matching data that has been once optimized in terms of the amount of information, and therefore the process of optimizing the amount of simplified matching data is performed again. The degradation of accuracy of matching is thereby prevented.

The functions of the functional units of the terminal 20 are described hereinafter with reference back to FIG. 4. The positioning unit 21 is a part that acquires position information indicating the located position of the terminal 20 and it is a GPS device, for example. The positioning unit 21 sends out the acquired position information to the position information transmitting unit 22. The position information transmitting unit 22 is a part that transmits the position information to the object information provision device 10.

The object information acquisition unit 23 is a part that receives matching data and virtual object information transmitted from the object information provision device 10. The object information acquisition unit 23 stores the matching data and the virtual object information into the object information storage unit 24.

The object information storage unit 24 is a part that stores the matching data and the virtual object information received by the object information acquisition unit 23 and includes a matching data storage unit 24A and a virtual object storage unit 24B. FIG. 7 is a diagram showing a structure of the object information storage unit 24 and an example of data stored therein. The object information storage unit 24 stores perfect matching data, simplified matching data and virtual object information in association with ID that identifies object information. Specifically, the matching data storage unit 24A corresponds to the columns of perfect matching data and simplified matching data in the table of FIG. 7, and the virtual object storage unit 24B corresponds to the column of virtual object information in the table of FIG. 7.

The image capture unit 25 is a part that captures a real-space image and it is a device such as a camera, for example. The image capture unit 25 sends out the real-space image to the image analysis unit 26.

The image analysis unit 26 is a part that performs image analysis that extracts a physical object from a real-space image based on matching data received by the object information acquisition unit 23.

Specifically, when the object information acquisition unit 23 acquires perfect matching data and simplified matching data from the object information provision device 10, the image analysis unit 26 performs image analysis that extracts a physical object from a real-space image based on each of the perfect matching data and the simplified matching data. Then, the image analysis unit 26 sends out information about the success or failure of extraction of a physical object based on each of the perfect matching data and the simplified matching data to the image analysis result transmitting unit 27.

On the other hand, when the object information acquisition unit 23 acquires only simplified matching data from the object information provision device 10, the image analysis unit 26 performs image analysis that extracts a physical object from a real-space image based on the simplified matching data. Then, the image analysis unit 26 sends out information about the success or failure of extraction of a physical object based on the simplified matching data to the image analysis result transmitting unit 27.

The image analysis result transmitting unit 27 is a part that transmits a processing result indicating the success or failure of extraction of a valid physical object represented by the matching data in the image analysis performed by the image analysis unit 26 to the object information provision device.

Specifically, when extraction of a physical object based on each of perfect matching data and simplified matching data is performed in the image analysis unit 26, information about the success or failure of each extraction of a physical object is acquired from the image analysis unit 26, and physical objects extracted by the respective extraction match, the image analysis result transmitting unit 27 transmits "OK notification" to the object information provision device 10. The "OK notification" is a notification indicating that a physical object extracted based on simplified matching data is a valid physical object represented by the matching data. On the other hand, when physical objects extracted by the respective extraction do not match, the image analysis result transmitting unit 27 transmits "NG notification 1" to the object information provision device 10. The "NG notification 1" is a notification indicating that a physical object extracted based on simplified matching data is not a valid physical object represented by the matching data.

Further, when extraction of a physical object based on simplified matching data only is performed in the image analysis unit 26 and a plurality of physical objects are extracted, the image analysis result transmitting unit 27 transmits "NG notification 2" to the object information provision device 10. The "NG notification 2" is a notification indicating that a plurality of physical objects including an object different from a valid physical object is extracted based on simplified matching data.

Furthermore, when extraction of a physical object based on each of perfect matching data and simplified matching data is performed in the image analysis unit 26 and physical objects extracted by the respective extraction match, or when extraction of a physical object based on simplified matching data only is performed in the image analysis unit 26 and one physical object is extracted, the image analysis unit 26 sends out an extraction result of a physical object in a real-space image and object information together with the real-space image to the display unit 28. The extraction result contains information indicating the position and size of the physical object in the real-space image.

The display unit 28 is a part that displays a virtual object superimposed on a real-space image and it includes a device such as a display, for example. Specifically, the display unit 28 displays the virtual object associated with the matching data used for the image analysis in the object information storage unit 24 so that it is superimposed on a real-space image in association with the physical object extracted by the image analysis unit 26.

Figure 8:
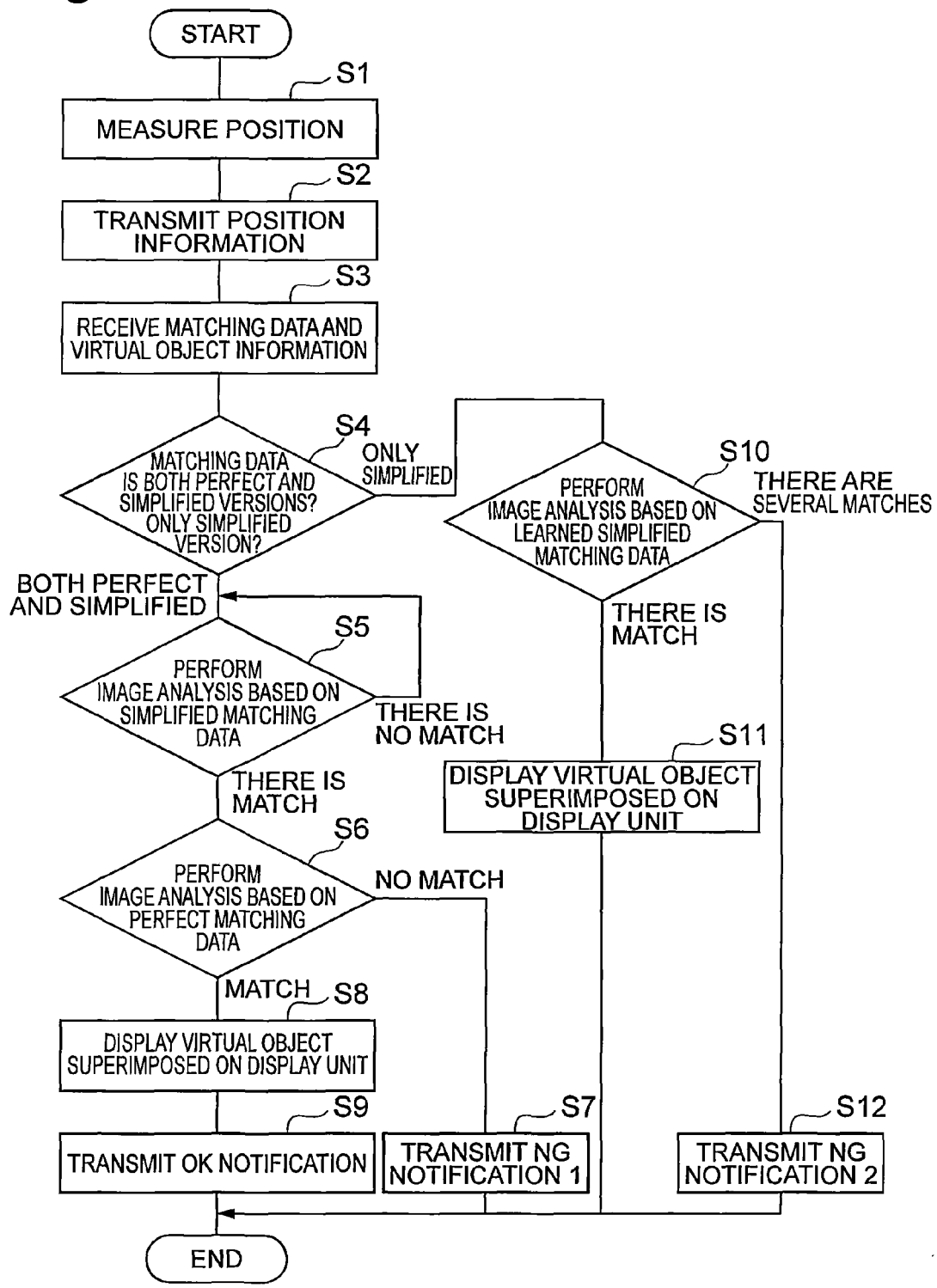
FIG. 8 is a flowchart showing processing of the terminal in an object information provision method.

Processing that is performed by the terminal 20 in an object information provision method in the object information provision system 1 is described hereinafter with reference to FIG. 8.

First, the positioning unit 21 acquires position information indicating the located position of the terminal 20 (S1). The position information transmitting unit 22 then transmits the position information to the object information provision device 10 (S2).

Then, the object information acquisition unit 23 receives matching data and virtual object information transmitted from the object information provision device 10 in response to the position information transmitted in Step S2 (S3). The object information acquisition unit 23 stores the matching data and the virtual object information into the object information storage unit 24.

Then, the image analysis unit 26 determines whether the object information acquisition unit 23 has acquired both of perfect matching data and simplified matching data or acquired only simplified matching data from the object information provision device 10 (S4). When it is determined that both of perfect matching data and simplified matching data have been acquired, the process proceeds to Step S5. On the other hand, when it is determined that only simplified matching data has been acquired, the process proceeds to Step S10.

In Step S5, the image analysis unit 26 performs image analysis that extracts a physical object from a real-space image acquired by the image capture unit 25 based on the simplified matching data acquired in Step S3 (S5). The processing of Step S5 is repeated until any physical object is extracted from the real-space image by matching using the simplified matching data.

Next, the image analysis unit 26 performs image analysis that extracts a physical object from a real-space image acquired by the image capture unit 25 based on the perfect matching data acquired in Step S3 (S6). Because perfect matching data contains a large amount of information, a physical object extracted based on the perfect matching data is likely to be a valid physical object represented by the matching data. Then, the image analysis unit 26 determines whether the physical object extracted based on the perfect matching data and the physical object extracted based on the simplified matching data in Step S5 match or not.

When it is determined that they do not match, the process proceeds to Step S7. In this case, the physical object extracted in Step S5 is not a valid physical object, and therefore the image analysis result transmitting unit 27 transmits "NG notification 1" to the object information provision device 10 (S7).

On the other hand, when it is determined that they match, the process proceeds to Step S8. In this case, the physical object extracted in Step S5 is a valid physical object, and therefore the display unit 28 displays the virtual object acquired in Step S3 in association with the physical object extracted by the image analysis unit 26 superimposed on the real-space image (S8). Further, in the following step S9, the image analysis result transmitting unit 27 transmits "OK notification" to the object information provision device 10 (S9).

Further, in Step S10, the image analysis unit 26 performs image analysis that extracts a physical object from a real-space image based on the simplified matching data acquired in Step S3 (S10). The case where only the simplified matching data is transmitted from the object information provision device 10 is the case where the simplified matching data that is the most suitable for image analysis has been determined in the object information provision device 10. Thus, this simplified matching data is learned simplified matching data.

When one physical object is extracted from the real-space image based on the learned simplified matching data, the process proceeds to Step S11. In this case, the extracted physical object is likely to be a valid physical object represented by the simplified matching data, and therefore the display unit 28 displays the virtual object acquired in Step S3 in association with the physical object extracted by the image analysis unit 26 superimposed on the real-space image (S11).

On the other hand, when a plurality of physical objects are extracted from the real-space image based on the learned simplified matching data, the process proceeds to Step S12. In this case, the simplified matching data that has been once set to be the learned data is not the most suitable for image analysis, and therefore the image analysis result transmitting unit 27 transmits "NG notification 2" to the object information provision device 10 (S12).

Figure 9:
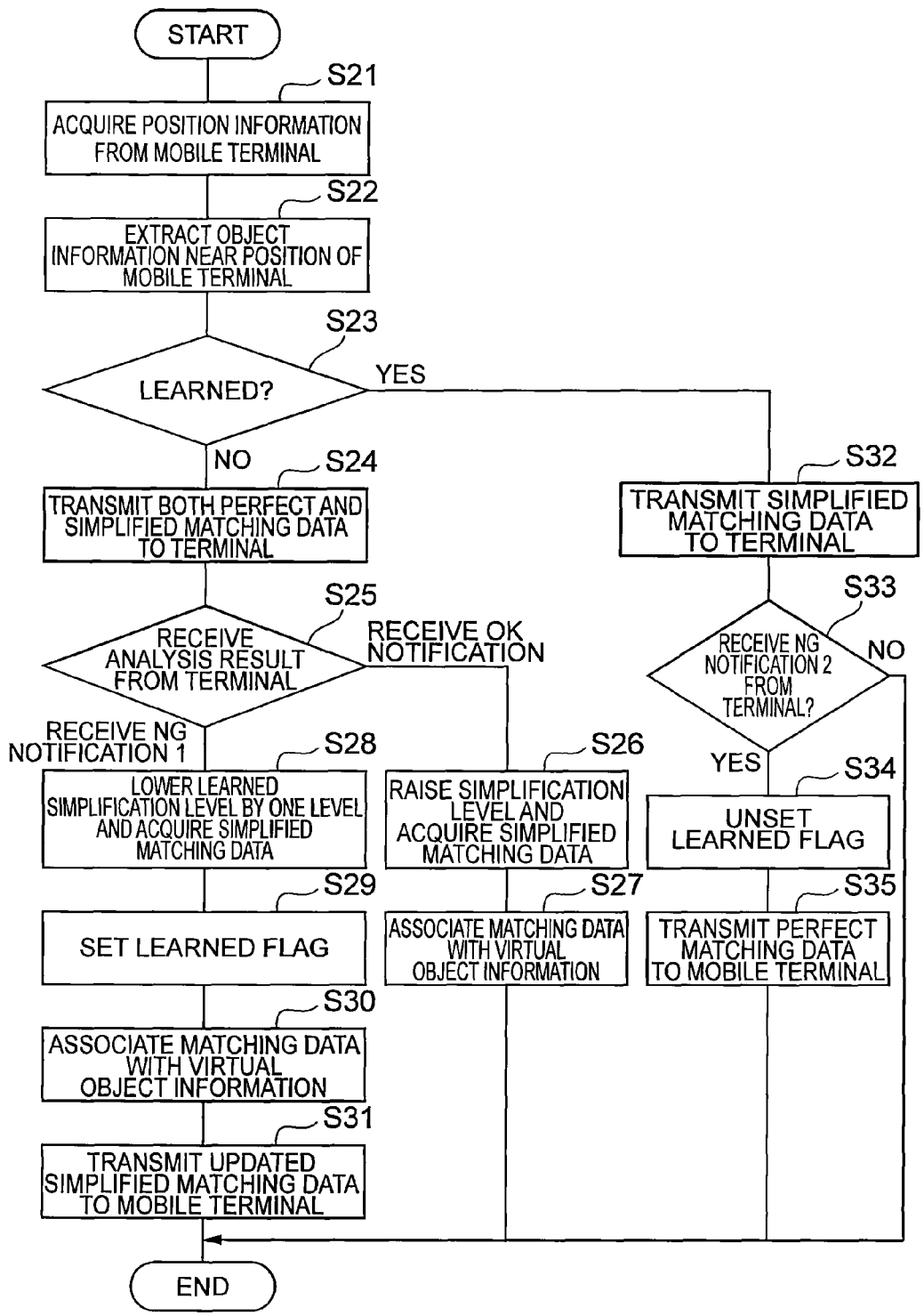
FIG. 9 is a flowchart showing processing of the object information provision device in the object information provision method.

Hereinafter, processing of the object information provision method in the object information provision device 10 is described. FIG. 9 is a flowchart showing processing of the object information provision method in the object information provision device 10.

First, the position information acquisition unit 11 acquires position information indicating the located position of the terminal 20 (S21). The object information extraction unit 12 then extracts object information related to a virtual object placed in the vicinity of the position indicated by the position information acquired from the position information acquisition unit 11 from the object information storage unit 13 by reference to the object information storage unit 13 (S22).

Then, the object information transmitting unit 14 determines whether the learned flag is set to the extracted object information (S23). When it is not determined that the learned flag is set, the process proceeds to Step S24. On the other hand, when it is determined that the learned flag is set, the process proceeds to Step S32.

In Step S24, when the learned flag associated with the virtual object information is not set, the most suitable simplified matching data is not determined, and therefore the object information transmitting unit 14 transmits perfect matching data and simplified matching data to the terminal 20 (S24). Then, the image analysis result receiving unit 15 receives a notification of a processing result in image analysis that extracts a physical object from a real-space image which has been performed in the terminal 20 based on the matching data transmitted in Step S24 (S25).

When "OK notification" is received, the process proceeds to Step S26. In this case, there is a possibility that a valid physical object can be extracted even when the amount of information of simplified matching data is further reduced. Thus, the matching data adjustment unit 16 acquires simplified matching data whose simplification level is one level higher than the simplified matching data transmitted in Step S24 from the matching data storage unit 13A (S26). Then, the matching data adjustment unit 16 stores the simplified matching data acquired in Step S26 in association with the virtual object information transmitted in Step S24 into the virtual object storage unit 13B (S27).

On the other hand, when "NG notification 1" is received in Step S25, the process proceeds to Step S28. In this case, it is considered that the simplified matching data transmitted in Step S24 is simplified matching data whose simplification level is one level higher than the simplified matching data having the smallest amount of information among the simplified matching data that can extract a valid physical object. Thus, the matching data adjustment unit 16 acquires simplified matching data whose simplification level is one level lower than the simplified matching data transmitted in Step S24 from the matching data storage unit 13A (S28). Then, the matching data adjustment unit 16 sets the learned flag (learned flag=1) in association with the virtual object information (S29), and stores the simplified matching data acquired in Step S28 in association with the virtual object information transmitted in Step S24 into the virtual object storage unit 13B (S30). Further, the object information transmitting unit 14 may transmit the updated simplified matching data to the terminal 20 for use in the image analysis (S31).

In Step S32, when the learned flag associated with the virtual object information is set, the most suitable simplified matching data is determined, and therefore the object information transmitting unit 14 transmits only simplified matching data to the terminal 20. Then, the image analysis result receiving unit 15 determines whether "NG notification 2" is received as a notification of a processing result in image analysis that extracts a physical object from a real-space image which has been performed in the terminal 20 based on the simplified matching data transmitted in Step S32 (S33). When it is determined that "NG notification 2" is received, the process proceeds to Step S34. On the other hand, when it is not determined that "NG notification 2" is received, the process ends.

In Step S34, the matching data adjustment unit 16 unsets the learned flag (learned flag=0) related to the virtual object information (S34). In this case, the process of optimizing the amount of information of simplified matching data is performed again, considering that there is a possibility that the simplified matching data that has been once optimized in terms of the amount of information is not the most suitable data. Further, the object information transmitting unit 14 may transmit the perfect simplified matching data to the terminal 20 for use in the image analysis (S35). The process thereby ends.

According to the object information provision device 10, the object information provision system 1, the terminal 20 and the object information provision method of this embodiment, at least one matching data is transmitted from the object information provision device 10 to the terminal 20, a result of image analysis on the basis of the matching data is transmitted from the terminal 20 to the object information provision device 10, and the amount of information of matching data is adjusted based on the image analysis result. The success or failure of extraction of a valid physical object represented by matching data in the terminal 20 is thereby reflected on the amount of information of matching data. It is thereby possible to provide matching data having an appropriate amount of information without degrading the accuracy of matching between matching data and a physical object in a real-space image.

Although an embodiment of the present invention is described in the foregoing, the present invention is not restricted to the above-described embodiment, and various changes and modifications may be made without departing from the scope of the invention.

For example, because the accuracy of extraction of a physical object from a real-space image based on matching data sometimes depends on various conditions such as the distance between the physical object and the terminal 20, the displacement (angle) of the direction where the terminal 20 is located on the basis of the physical object with respect to the normal direction of the physical object, and the amount of light, and therefore the matching data adjustment unit 16 may perform adjustment of matching data in consideration of the dependence. Specifically, the image analysis result transmitting unit 27 of the terminal 20 transmits the position information and the direction information of the terminal 20, together with information about the success or failure of extraction of a physical object based on matching data in the image analysis unit 26, to the object information provision device 10. The direction information can be acquired by a device such as a geomagnetic sensor and an acceleration sensor (not shown) mounted on the terminal 20. Then, the matching data adjustment unit 16 of the object information provision device 10 calculates the distance between the physical object and the terminal 20 and the angle formed by the direction where the terminal 20 is located with respect to the normal direction of the physical object based on the received position information and direction information and information about the position and direction of the physical object stored in the object information storage unit 13. The matching data adjustment unit 16 may classify the calculated distance and angle into a plurality of specified ranges that are predetermined for values of distance and angle and adjust the amount of information of matching data for each of the classified ranges of distance and angle. The matching data adjustment unit 16 can thereby select suitable simplified matching data for each of the classified ranges of distance and angle. Note that the matching data adjustment unit 16 may select simplified matching data for each range of distance and angle and each range of time.

Further, in this embodiment, the matching data adjustment unit 16 selects and changes simplified matching data (S26, S28 to S29, S34) each time it receives information about the success or failure of extraction of a physical object based on matching data in the image analysis unit 26 (S25, S33) as shown in FIG. 9, for example. On the other hand, in consideration that the accuracy related to the success or failure of extraction of a physical object from a real-space image based on matching data varies depending on various external factors such as the amount of light, the performance of a camera and the user's camera shake occurring in the terminal 20 at the time of taking an image, the matching data adjustment unit 16 may select and change simplified matching data when it receives a notification of the same type related to the success or failure of extraction of a physical object a specified number of times or more or a specified rate or more in the state where a certain simplification level is set. Further, the matching data adjustment unit 16 may accumulate the number of notifications about the success or failure of extraction of a physical object for each simplification level, statistically processes the accumulated number of notifications and then select simplified matching data.

INDUSTRIAL APPLICABILITY

According to this embodiment, it is possible to provide matching data having an appropriate amount of information without degrading the accuracy of matching with a physical object on a real-space image in AR technology that extracts a specified physical object on a real-space image and displays a virtual object in association with the physical object.

REFERENCE SIGNS LIST

1 . . . object information provision system, 10 . . . object information provision device, 11 . . . position information acquisition unit, 12 . . . object information extraction unit, 13 . . . object information storage unit, 13A . . . matching data storage unit, 13B . . . virtual object storage unit, 14 . . . object information transmitting unit, 15 . . . image analysis result receiving unit, 16 . . . matching data adjustment unit, 20 . . . terminal, 21 . . . positioning unit, 22 . . . position information transmitting unit, 23 . . . object information acquisition unit, 24 . . . object information storage unit, 24A . . . matching data storage unit, 24B . . . virtual object storage unit, 25 . . . image capture unit, 26 . . . image analysis unit, 27 . . . image analysis result transmitting unit, 28 . . . display unit, N . . . network

The invention claimed is:

1. An object information provision device that provides virtual object information associated with matching data to a terminal that extracts a physical object matched to matching data for extracting a specified physical object from a real-space image by a certain percentage or more from a real-space image and displays a virtual object associated with the matching data superimposed on the real-space image in association with the physical object, comprising:
  a transmitting unit configured to transmit at least one matching data among a plurality of matching data containing different levels of amount of information together with virtual object information associated with the matching data to the terminal;
  a receiving unit configured to receive a processing result indicating success or failure of extraction of a valid physical object represented by the matching data in image analysis that extracts a physical object from a real-space image in the terminal based on the matching data transmitted by the transmitting unit from the terminal; and
  an adjustment unit configured to adjust the amount of information of matching data to be provided in association with the virtual object information to the terminal based on the processing result received by the receiving unit.

2. The object information provision device according to claim 1, wherein
  the plurality of matching data include one perfect matching data with the largest amount of information among the plurality of matching data and a plurality of simplified matching data containing different levels of amount of information,
  the transmitting unit transmits the perfect matching data and simplified matching data containing one level of amount of information among a plurality of levels of amount of information together with the virtual object information, and
  the adjustment unit associates simplified matching data having a smaller amount of information than the one level of amount of information with the virtual object information when the valid physical object is extracted in the image analysis based on the simplified matching data, and associates simplified matching data having a larger amount of information than the one level of amount of information with the virtual object information when the valid physical object is not extracted.

3. The object information provision device according to claim 2, wherein
  when the valid physical object is not extracted in the image analysis, the adjustment unit associates simplified matching data having a larger amount of information than the one level of amount of information with the virtual object information and sets a learned flag indicating that simplified matching data suitable for extracting a valid physical object is associated with the virtual object information in association with the virtual object information.

4. The object information provision device according to claim 3, wherein
  the transmitting unit transmits simplified matching data associated with the virtual object information together with the virtual object information when the learned flag is set in association with the virtual object information, and
  the adjustment unit unsets the learned flag related to the virtual object information when an object different from a valid physical object is extracted in the image analysis based on the simplified matching data transmitted by the transmitting unit.

5. An object information provision system including a terminal that extracts a physical object matched to matching data for extracting a specified physical object from a real-space image by a certain percentage or more from a real-space image and displays a virtual object associated with the matching data superimposed on the real-space image in association with the physical object, and an object information provision device that provides virtual object information associated with matching data to the terminal,
  the object information provision device comprising:
  a transmitting unit configured to transmit at least one matching data among a plurality of matching data containing different levels of amount of information together with virtual object information associated with the matching data to the terminal;
  a receiving unit configured to receive a processing result indicating success or failure of extraction of a valid physical object represented by the matching data in image analysis that extracts a physical object from a real-space image in the terminal based on the matching data transmitted by the transmitting unit from the terminal; and an adjustment unit configured to adjust the amount of information of matching data to be provided in association with the virtual object information to the terminal based on the processing result received by the receiving unit, and the terminal comprising:

an object information receiving unit configured to receive the matching data and the virtual object information transmitted from the transmitting unit;

an image analysis unit configured to perform the image analysis based on the matching data received by the object information receiving unit; and an image analysis result transmitting unit configured to transmit the processing result in the image analysis performed by the image analysis unit to the object information provision device.

6. The object information provision system according to claim 5, wherein the plurality of matching data include one perfect matching data with the largest amount of information among the plurality of matching data and a plurality of simplified matching data containing different levels of amount of information, the transmitting unit transmits the perfect matching data and simplified matching data containing one level of amount of information among a plurality of levels of amount of information together with the virtual object information, the adjustment unit associates simplified matching data having a smaller amount of information than the one level of amount of information with the virtual object information when the valid physical object is extracted in the image analysis, and associates simplified matching data having a larger amount of information than the one level of amount of information with the virtual object information when the valid physical object is not extracted in the image analysis, the object information receiving unit receives the perfect matching data and the simplified matching data transmitted from the transmitting unit, the image analysis unit performs the image analysis based on each of the perfect matching data and the simplified matching data received by the object information receiving unit, and the image analysis result transmitting unit transmits a processing result indicating that a valid physical object is extracted to the object information provision device when a physical object extracted based on the perfect matching data and a physical object extracted based on the simplified matching data match, and transmits a processing result indicating that a valid physical object is not extracted to the object information provision device when a physical object extracted based on the perfect matching data and a physical object extracted based on the simplified matching data do not match.

7. The object information provision system according to claim 6, wherein when the valid physical object is not extracted in the image analysis, the adjustment unit associates simplified matching data having a larger amount of information than the one level of amount of information with the virtual object information and sets a learned flag indicating that simplified matching data suitable for extracting a valid physical object is associated with the virtual object information in association with the virtual object information.

8. The object information provision system according to claim 7, wherein the transmitting unit transmits simplified matching data associated with the virtual object information together with the virtual object information when the learned flag is set in association with the virtual object information, the adjustment unit unsets the learned flag related to the virtual object information when an object different from a valid physical object is extracted in the image analysis based on the simplified matching data transmitted by the transmitting unit, the image analysis unit performs the image analysis based on the simplified matching data received by the object information receiving unit, and the image analysis result transmitting unit transmits a processing result indicating that an object different from a valid physical object is extracted to the object information provision device when a plurality of physical objects are extracted based on the simplified matching data in the image analysis.

9. A terminal in an object information provision system including the terminal that extracts a physical object matched to matching data for extracting a specified physical object from a real-space image by a certain percentage or more from a real-space image and displays a virtual object associated with the matching data superimposed on the real-space image in association with the physical object, and an object information provision device that provides virtual object information associated with matching data to the terminal, comprising:

an object information receiving unit configured to receive at least one matching data among a plurality of matching data containing different levels of amount of information together with virtual object information associated with the matching data from the object information provision device;

an image analysis unit configured to perform image analysis that extracts a physical object from a real-space image based on the matching data received by the object information receiving unit; and an image analysis result transmitting unit configured to transmit a processing result indicating success or failure of extraction of a valid physical object represented by the matching data in the image analysis performed by the image analysis unit to the object information provision device.

10. The terminal according to claim 9, wherein the plurality of matching data include one perfect matching data with the largest amount of information among the plurality of matching data and a plurality of simplified matching data containing different levels of amount of information, the object information receiving unit receives the perfect matching data and simplified matching data containing one level of amount of information among a plurality of levels of amount of information transmitted from the transmitting unit, the image analysis unit performs the image analysis based on each of the perfect matching data and the simplified matching data received by the object information receiving unit, and the image analysis result transmitting unit transmits a processing result indicating that a valid physical object is extracted to the object information provision device when a physical object extracted based on the perfect matching data and a physical object extracted based on the simplified matching data match, and transmits a processing result indicating that a valid physical object is not extracted to the object information provision device when a physical object extracted based on the perfect matching data and a physical object extracted based on the simplified matching data do not match.

11. An object information provision method in an object information provision device that provides virtual object information associated with matching data to a terminal that extracts a physical object matched to matching data for extracting a specified physical object from a real-space image by a certain percentage or more from a real-space image and displays a virtual object associated with the matching data superimposed on the real-space image in association with the physical object, comprising:
  a transmitting step of transmitting at least one matching data among a plurality of matching data containing different levels of amount of information together with virtual object information associated with the matching data to the terminal;
  a receiving step of receiving a processing result indicating success or failure of extraction of a valid physical object represented by the matching data in image analysis that extracts a physical object from a real-space image in the terminal based on the matching data transmitted in the transmitting step from the terminal; and
  an adjustment step of adjusting the amount of information of matching data to be provided in association with the virtual object information to the terminal based on the processing result received in the receiving step.

12. An object information provision method in a system including a terminal that extracts a physical object matched to matching data for extracting a specified physical object from a real-space image by a certain percentage or more from a real-space image and displays a virtual object associated with the matching data superimposed on the real-space image in association with the physical object, and an object information provision device that provides virtual object information associated with matching data to the terminal, comprising:
  a transmitting step of transmitting at least one matching data among a plurality of matching data containing different levels of amount of information together with virtual object information associated with the matching data from the object information provision device to the terminal;
  an object information receiving step of receiving the one matching data and the virtual object information transmitted in the transmitting step by the terminal;
  an image analysis step of performing image analysis that extracts a physical object from a real-space image in the terminal based on the matching data received in the object information receiving step;
  an image analysis result transmitting step of transmitting a processing result indicating success or failure of extraction of a valid physical object represented by the matching data in the image analysis performed in the image analysis step from the terminal to the object information provision device;
  a receiving step of receiving the processing result transmitted in the image analysis result transmitting step by the object information provision device; and
  an adjustment step of adjusting the amount of information of matching data to be provided in association with the virtual object information to the terminal in the object information provision device based on the processing result received in the receiving step.

* * * * *